UNITED STATES PATENT OFFICE.

ROBERT SHARP, OF SAN JOSE, CALIFORNIA.

WALL-FINISHING COMPOSITION.

1,309,782.   Specification of Letters Patent.   Patented July 15, 1919.

No Drawing.   Application filed December 17, 1917.   Serial No. 207,595.

*To all whom it may concern:*

Be it known that I, ROBERT SHARP, a citizen of the United States, and resident of San Jose, in the county of Santa Clara and State of California, have invented certain new and useful Improvements in Wall-Finishing Compositions, of which the following is a specification.

My invention relates to an improved composition for use in finishing walls, and particularly for use in surfacing and tinting plastered walls.

The object of my invention is to provide a composition of such a nature that it will satisfactorily cover a wall with one application or coat. In refinishing or tinting old walls it is usually necessary to thoroughly clean and size the surface before the new tint is applied. Old walls that are greasy and spotted usually requires two coats of the new tint in order to get a uniform color. I have discovered that a composition made up of a suitable body material such as whiting, or Paris white, or pigments, a silicate bearing material, glue, alum and linseed oil in proper proportions according to the character of the surface to be covered and with sufficient water to secure the required consistency, forms a covering medium that readily adheres to dirty or greasy walls and furnishes a uniform, solid and lasting surface and color in one application. It not only forms a solid even color by satisfactorily covering water stains, neutralizing lime burns and other faulty conditions of the wall but it dries quickly, stops suction and shows no laps.

While the proportions of the ingredients may vary somewhat widely according to the necessities of each case, I have found that a composition prepared as follows is satisfactory for use on the average plastered wall that has become somewhat discolored, dirty or greasy.

First about 20 parts of Paris white is dissolved in water to form a medium thick paste. One part glue is then melted by the application of heat and the melted glue thoroughly mixed with the Paris white. If a tinting pigment is used then a portion of the Paris white is replaced with an equal amount of the pigment. One part alum dissolved in hot water and thoroughly mixed with the Paris white mixture. One-half part water glass is then mixed with three-quarters part raw linseed oil and then added to the first mixture and thoroughly mixed therewith. After this composition has been strained and diluted with water as required it is ready for use. I have found that the composition is improved if the mixture of linseed oil and water glass is thinned by adding thereto about an equal amount of hot water.

This composition may be evaporated to a dry state and then prepared for use by adding sufficient water to secure the necessary consistency.

It is understood of course that the invention is not limited to the disclosure of the details above set forth but is intended to cover all matter included within the scope of the appended claims.

I claim:—

1. A wall finishing composition comprising a body material, a water soluble silicate, glue, alum and linseed oil.

2. A wall finishing composition comprising whiting, a water soluble silicate, glue, alum and linseed oil.

3. A wall finishing composition comprising Paris white, water glass, glue, alum and raw linseed oil.

4. A wall finishing composition comprising Paris white substantially 20 parts, water glass substantially ½ part, glue substantially 1 part, alum substantially 1 part, and raw linseed oil substantially ¾ part.

In testimony whereof I have hereunto affixed my signature this 10th day of December, 1917.

ROBERT SHARP.

Copies of this patent may be obtained for five cents each, by addressing the "Commissioner of Patents, Washington, D. C."